Patented Oct. 6, 1942

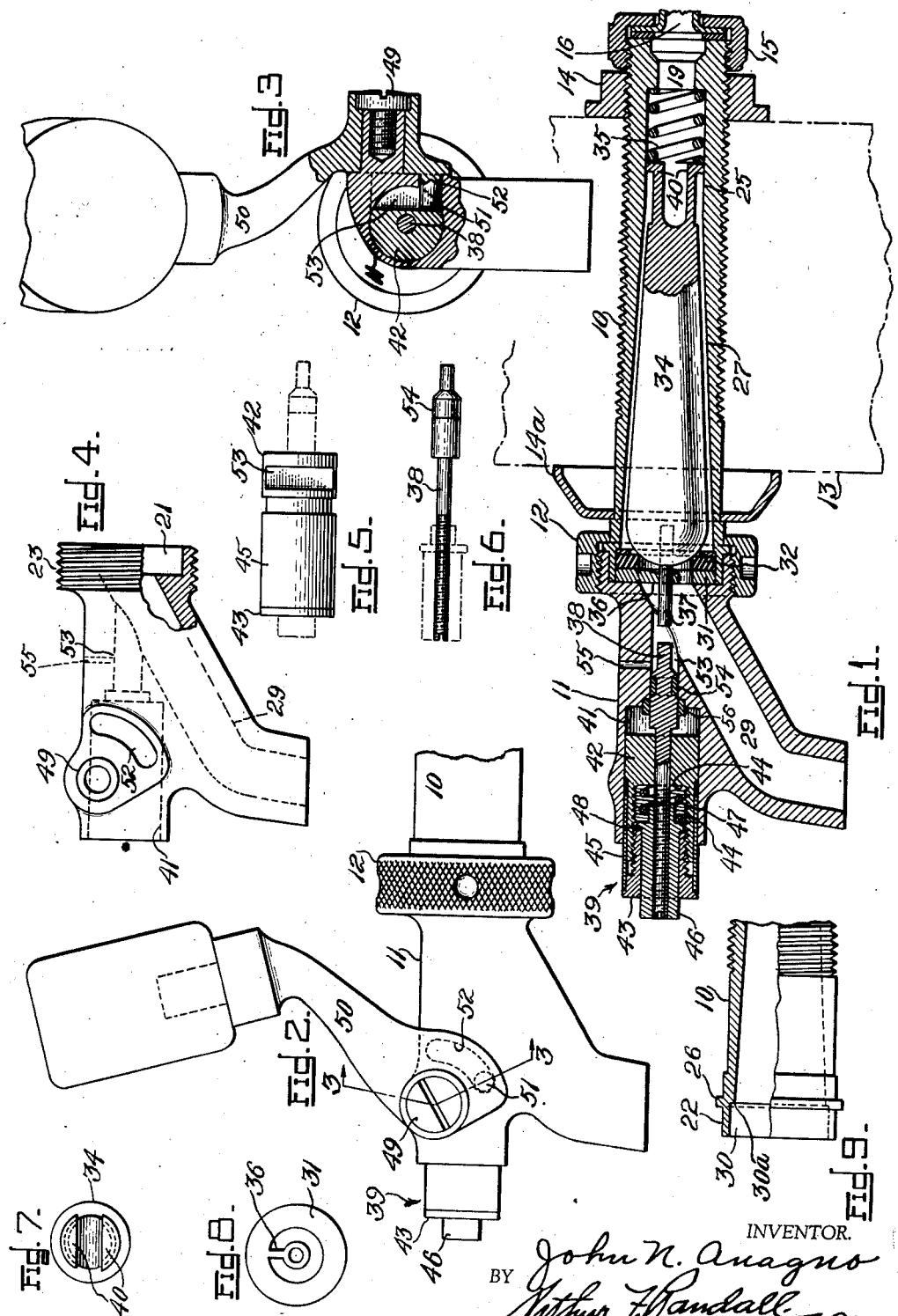

2,297,857

UNITED STATES PATENT OFFICE 2,297,857

FAUCET

John N. Anagno, Lynn, Mass.

Application May 23, 1941, Serial No. 394,849

7 Claims. (Cl. 225—5)

This invention relates to faucets or taps for incorporation in apparatus for dispensing carbonated liquids such as beer, and the object of the invention is to provide an improved faucet or tap of the character described which will be of simple, efficient and inexpensive construction.

It is also an object of this invention to provide a faucet or tap of the character described which may be adjusted or set to adapt it to the particular characteristics of the beer or the like being dispensed and to the particular apparatus or system within which it is incorporated.

To these ends I have provided an improved faucet or tap which, in its preferred form, may be constructed and operated as set forth in the following description, the several novel features of the invention being separately pointed out and defined in the claims at the close of the description.

In the accompanying drawing:

Figure 1 is a central longitudinal sectional view of a delivery faucet constructed in accordance with this invention.

Figure 2 is a side elevation of the outer end portion of the faucet shown in Fig. 1.

Figure 3 is a front view of the faucet partly in section approximately on the line 3—3 of Fig. 2.

Figure 4 is a side elevation, partly broken away and in section, of the outer nozzle section of the body, hereinafter described, of the faucet shown in Figs. 1, 2 and 3.

Figures 5 and 6 are details of the valve-operating piston hereinafter described.

Figure 7 is an end view of the valve hereinafter described.

Figure 8 is a detail hereinafter described.

Figure 9 is an elevation, partly in section, of the outer end portion of the tubular shank portion of the body of the faucet.

The illustrated embodiment of my invention is a delivery faucet comprising a body consisting of a straight tubular inner shank section 10 and an outer nozzle section 11 rigidly fastened together by an annular coupling member 12.

The shank section 10 is adapted to extend through a hole formed in the rear wall, indicated by broken lines at 13 in Fig. 1, of a refrigerator or other fixture and is exteriorly threaded to receive upon it a nut 14 by means of which the shank section is fixedly clamped to said wall, said nut bearing against the inner side of the wall while an abutment collar 14a mounted on the outer end of said shank section bears against the outer side thereof.

The inner end of the interior of the tubular shank section 10 is provided with an inlet port 19 that is connected by a supply tube 16 with the outlet of a barrel or other container (not shown) holding a supply of beer or the like that is under pressure, said tube being fixedly clamped to the inner end of the tubular shank section by a coupling member 15.

The inner end of the nozzle section 11 is counterbored to provide a socket 21 (Fig. 4) into which is telescopically fitted the outer end portion 22 (Fig. 9) of the shank section 10, while the exterior of said inner end portion is provided with screw threads 23 for engagement with threads provided upon the interior of coupling member 12.

The coupling member 12 is also made upon its interior, and at one end thereof, with an annular flange which bears against an annular shoulder 26 (Fig. 9) on shank section 10 to clamp the end of the latter within socket 21.

The outer end portion of the tubular shank section 10 is made interiorly with an elongate conical valve chamber 27 which tapers inwardly gradually from the outer end of said shank section and at its inner end is provided with a cylindrical extension or chamber 25 into which the beer or the like is delivered through inlet port 19.

When the faucet is opened as presently to be described, the outer end of the tapered valve chamber 27 is in communication through the central apertures of two washers 31 and 32 with the upper end of a downwardly oblique delivery port 29 formed in nozzle section 11 through which deliveries are made from the faucet.

The two washers or annuluses 31 and 32 are disposed within a countersink 30 (Fig. 9) formed within the outer end of shank section 10 and are clamped firmly in position between the bottom of countersink 21 (Fig. 4) and an annular shoulder 30a within shank section 10 (Fig. 9). Washer 31 is made from metal while the washer 32 is made from resilient rubber and serves as a yielding seat for an elongate tapered valve 34 disposed within the tapered chamber 27 of the tubular shank section 10.

The metal washer or annulus 31 is made with a radial apertured arm 36 which provides a bearing within which is slidably mounted a stem 37 projecting from the adjacent end of valve 34. At its inner end valve 34 is slotted longitudinally to provide oppositely disposed arms or tines 40 whose free ends slidably engage the interior surface of the wall that surrounds the cylindrical chamber 25 at opposite sides of the latter. These arms 40 and stem 37 slidably support the valve with its axis coincident with the axis of chambers 25 and 27.

The exterior conical surface of valve 34 and the inner conical surface of the wall surrounding chamber 27, are parallel and therefore it will be clear that when valve 34 is shifted to the extreme limit of its movement toward the right (Fig. 1) it will first be moved out of contact with seat washer 32 thus opening the faucet, and thereafter it will be seated upon the wall of chamber 27 and thereby close the faucet.

It will also be clear that the rate of flow of beer or the like through the faucet under a given pressure may be controlled by adjustment of the valve into an open intermediate position which will give the desired rate of flow.

The valve member 34 is yieldingly urged endwise toward and against seat washer 32 by the pressure of the beer or the like supplemented by a coiled spring 35 disposed within the inlet end of the tubular shank 10 between a shoulder upon the interior of the latter and the ends of the arms or tines 40.

The stem 37 at the opposite end of valve 34 is in axial alinement with a stem 38 forming part of a piston or plunger that is indicated generally at 39 in Fig. 1. Piston 39 is mounted for reciprocatory movement within a chamber 41 formed in the nozzle section 11 and comprises a cylindrical body including two sections 42 and 43, the former being made with a threaded counterbore 44 (Fig. 1) into which is screwed the exteriorly threaded inner end portion of the latter. The outer end portion of section 43 is of greater diameter than the inner exteriorly threaded portion and has rigidly fixed thereon one end of a sleeve 45 which is telescopically fitted upon the exterior of section 42. This construction provides for adjustment of section 43 toward and from section 42.

The section 43 of the piston body is made tubular and slidably mounted within the same is an interiorly threaded tubular nut 46 that is mounted upon the outer end portion of the stem 38, the latter being threaded to receive it. A coiled spring 47 within counterbore 44 bears at its one end against the inner end of nut 46 and yieldingly holds a flange 48 on nut 46 against the inner end of section 43.

The stem 38 extends loosely through the section 42 of the piston body so that said stem may be moved inwardly relatively to said piston body by finger pressure upon the outer end of nut 46 or upon said stem. It will also be clear that stem 38 may be adjusted endwise independently toward and from stem 37, and relatively to the piston body, by rotation of said stem 38 relatively to nut 46. To facilitate this operation the outer end of stem 38 may be formed with a transverse slot to receive the blade of a screwdriver or the like.

Pivotally mounted at 49 (Figs. 2 and 3) upon the exterior of nozzle section 11 is a hand lever 50 whose hub portion is provided upon its inner side with a stud or pin 51 projecting laterally through an arcuate slot 52 formed through the adjacent wall of nozzle section 11, into a socket or groove 53 (Figs. 3 and 5) provided upon the exterior of piston section 42. Pivotal movement of lever 50 is limited by the engagement of stud 51 with the opposite ends of slot 52 and it is to be observed that when lever 50 is swung forwardly (Fig. 2) to the limit of its movement in that direction the piston 39 is shifted inwardly and its stem 38, through abutting engagement with valve stem 37, shifts the valve 34 inwardly also against the pressure of the beer or the like and against the pressure of spring 35. It will also be observed that the axes of pivot 49 and stud 51 occupy approximately "dead center" relationship relatively to the direction of outward thrust imposed by these pressures upon piston 39 when lever 50 is at the limit of its forward movement, and therefore said pressures are prevented from swinging said lever in the opposite valve-closing direction so that it must be started in that direction manually. After being thus started, however, the pressures referred to are effective to complete the movement and hold valve 34 seated on annulus 32.

The inner end portion of the stem 38 occupies a passage 53 extending from countersink chamber 41 to the delivery port 29, and said inner end portion has mounted upon it a packing ring 54 of rubber which prevents leakage of beer or the like from port 29 to chamber 41 while a delivery is being made. An additional packing ring 56 may be provided at the inner end of chamber 41.

When piston 39 occupies its normal position at the limit of its outward movement the upper end of the delivery port 29 is vented to the outside atmosphere through passage 53 and a small vent port 55 whereof one end communicates with passage 53 and the opposite end with the outside atmosphere. The inner end of this vent port is in close proximity to the packing 54 so that immediately upon the start of the inward valve-opening movement of piston 39 vent port 55 is closed thus preventing the escape through the same of any of the beer that is about to be delivered. Vent 55 provides a quick drawing feature which avoids dripping after making a delivery and tends to maintain the interior of the nozzle section sanitarily dry while the faucet is idle.

With a given setting of the valve 34 when in its fully open position and a given pressure within the supply barrel or other container, the rate of delivery through the constricted conical pressure reducing conduit surrounding the valve 34 will vary with supply tubes 16 of different lengths and lifts. Also, the rate of flow will be different in the case of thin and heavy beers.

Since the parts of piston 39 are made relatively adjustable as above described it is possible to set the stem 38 so as to open valve 34 to an extent that is appropriate to the existing conditions, whatever they may be, in order to make proper delivery of the beer.

In other words, while the extent of reciprocatory movement of the inner abutment end of stem 38 under the influence of lever 50 may always be the same, the zone within which said end reciprocates can, through adjustment of the piston parts, be shifted toward or from the valve stem 37 to regulate the extent of opening movement of the valve 34.

Of course, it is also possible to set the parts of the piston 39 so that there is little or no lost motion between the stems 37 and 38 when lever 50 is operated, in which case the said lever 50 may be operated to control the flow as desired or to stop the flow by seating valve 34 either upon annulus 32 or upon the interior surface of the shank section.

Adjustment of piston 39 may conveniently be effected by manually rotating section 43 relatively to section 42.

"Cracking" of the beer as it is delivered may conveniently be effected by finger pressure imposed upon the outer end of tubular nut 46.

What I claim is:

1. A faucet of the character described comprising a body made with a delivery conduit including an elongate conical valve chamber having an inlet at the smaller end thereof through which beer or the like is supplied under pressure and an outlet at the opposite end thereof; a valve seat within said chamber surrounding said outlet; an elongate conical valve member disposed within said chamber and having an exterior surface that is approximately parallel with the interior surface of the wall surrounding said chamber; means adjacent to the opposite ends of said chamber for slidably supporting said valve member centrally within said chamber so that it is movable toward and from said seat and normally urged independently endwise against the latter by the pressure of the beer or the like to close said outlet port, and a manually operable piston independently and slidably supported by said body opposite and axially alined with the outer larger end of said valve so that it is operable when moved endwise toward the latter to adjust said valve member away from said seat through endwise abutting engagement therewith.

2. A faucet of the character described constructed in accordance with claim 1 and wherein the supporting means for the larger end of said valve includes an axially disposed stem projecting from said larger end and slidably supported within a bearing on said body with its outer end in position to cooperate with said piston.

3. A faucet of the character described constructed in accordance with claim 1 and wherein there is also provided a hand lever pivotally mounted upon the exterior of said body so as to swing longitudinally thereof on an axis at right angles to the axis of said piston, and means coupling said lever to said piston so that the latter is reciprocated by swinging movement of said lever.

4. A faucet of the character described constructed in accordance with claim 1 and wherein there is also provided a hand lever pivotally mounted upon the exterior of said body so as to swing longitudinally thereof on an axis at right angles to the axis of said piston, said lever being provided with a stud projecting through a slot formed in said body into a socket provided in said piston so that the latter is reciprocated by swinging movement of said lever.

5. A faucet of the character described having, in combination, a faucet body made with a delivery conduit including a valve chamber having an outlet at one end thereof; a valve seat within said chamber surrounding said outlet; a valve slidably supported within said conduit and normally urged independently against said seat by the pressure of the beer or the like to close said outlet; a piston comprising a body slidably mounted within a chamber provided in said faucet body which communicates with said conduit, said piston also comprising a stem extending loosely through said piston body and movable endwise with the latter to cause its inner end to abut and open said valve when the piston body is moved toward the latter and said stem being independently movable endwise relatively to said piston body by finger pressure imposed upon its outer end to control and operate said valve, and a piston-operating hand lever pivotally mounted upon the exterior of said faucet body and connected with said piston body.

6. A faucet of the character described constructed in accordance with claim 5 wherein said piston body consists of two intermeshing threaded sections which are adjustable toward and from each other by relative rotary movement thereof, one of said sections being connected with said piston-operating lever, and said stem being co-operatively associated with the other of said two sections so that it is adjusted toward and from said valve and relatively to said piston body when said two body sections are adjusted relatively.

7. A faucet of the character described constructed in accordance with claim 5 wherein said piston body consists of two intermeshing threaded sections which are adjustable toward and from each other by relative rotary movement thereof, one of said sections being connected with said piston-operating lever, and said stem being slidably connected with the other of said two sections so that it is adjusted toward said valve when said two sections are moved in that direction and also so that said stem is independently movable toward said valve by finger pressure imposed thereon to open said valve, and a spring for restoring said stem to its normal position relatively to said sections.

JOHN N. ANAGNO.